US011837248B2

(12) United States Patent
Appleton et al.

(10) Patent No.: US 11,837,248 B2
(45) Date of Patent: Dec. 5, 2023

(54) FILTER ADAPTATION STEP SIZE CONTROL FOR ECHO CANCELLATION

(71) Applicant: Dolby Laboratories Licensing Corporation, San Francisco, CA (US)

(72) Inventors: Nicholas Luke Appleton, Rosebery (AU); Jenean Jiaying Lee, Artarmon (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/786,138

(22) PCT Filed: Dec. 11, 2020

(86) PCT No.: PCT/US2020/064397
§ 371 (c)(1),
(2) Date: Jun. 16, 2022

(87) PCT Pub. No.: WO2021/126670
PCT Pub. Date: Jun. 24, 2021

(65) Prior Publication Data
US 2023/0021739 A1 Jan. 26, 2023

Related U.S. Application Data

(60) Provisional application No. 63/120,408, filed on Dec. 2, 2020, provisional application No. 62/990,870, filed
(Continued)

(51) Int. Cl.
*H04B 3/20* (2006.01)
*G10L 21/0208* (2013.01)

(52) U.S. Cl.
CPC .................... *G10L 21/0208* (2013.01); *G10L 2021/02082* (2013.01)

(58) Field of Classification Search
CPC ................ G10L 21/02; G10L 21/0208; G10L 2021/02082
(Continued)

(56) References Cited

U.S. PATENT DOCUMENTS 5,592,548 A 1/1997 Sih
6,563,803 B1 5/2003 Lee
(Continued)

FOREIGN PATENT DOCUMENTS

EP 2041883 B1 * 12/2011 ............ G10L 21/02
JP 5016551 B2 9/2012
(Continued)

OTHER PUBLICATIONS

Burton, T. et al. "A Generalized Proportionate Subband Adaptive Second-Order Volterra Filter for Acoustic Echo Cancellation in Changing Environments" UEEE Transactions on Audio, Speech, and Language Processing, vol. 19, No. 8, Nov. 2011, pp. 2364-2373.
(Continued)

*Primary Examiner* — MD S Elahee

(57) ABSTRACT

In some embodiments, an echo cancellation method which includes adaptation of at least one prediction filter, with adaptation step size controlled using gradient descent on a set of filter coefficients of the filter, where control of the adaptation step size is based at least in part on a direction of adaptation and a predictability of a gradient of adaptation (e.g., a gradient vector). Other aspects of embodiments of the invention include systems, methods, and computer program products for controlling adaptation step size of adaptive (e.g., low-complexity adaptive) echo cancellation. In some embodiments, adaptation step size control is based on a normalized, scaled gradient of adaptation, or includes smoothing of a normalized gradient of adaptation.

20 Claims, 3 Drawing Sheets

Related U.S. Application Data on Mar. 17, 2020, provisional application No. 62/949,598, filed on Dec. 18, 2019.

(58) Field of Classification Search
USPC .......................................................... 381/66
See application file for complete search history.

(56) References Cited

U.S. PATENT DOCUMENTS

| | | | |
|---|---|---|---|
| 6,707,912 B2 | 3/2004 | Stephens | |
| 6,947,550 B2 | 9/2005 | Xiong | |
| 7,031,461 B2 | 4/2006 | Lipari, II | |
| 7,099,460 B1 | 8/2006 | Shraga | |
| 8,014,516 B2 | 9/2011 | Hsu | |
| 8,073,133 B2 | 12/2011 | Ishiguro | |
| 8,363,712 B2 | 1/2013 | Hormis | |
| 9,036,815 B2 | 5/2015 | Lee | |
| 9,036,816 B1 | 5/2015 | Ayrapetian | |
| 9,172,791 B1 | 10/2015 | Ayrapetian | |
| 9,344,579 B2 | 5/2016 | Lu | |
| 9,754,605 B1 | 9/2017 | Chhetri | |
| 10,163,432 B2 | 12/2018 | Every | |
| 10,367,948 B2 | 7/2019 | Wells-Rutherford | |
| 10,482,895 B2 | 11/2019 | Lashkari | |
| 11,189,297 B1 * | 11/2021 | Nakagawa | G10L 21/0208 |
| 2006/0018459 A1 | 1/2006 | McCree | |
| 2006/0018460 A1 | 1/2006 | McCree | |
| 2009/0281800 A1 | 11/2009 | Leblanc | |
| 2015/0371658 A1 | 12/2015 | Gao | |
| 2017/0372722 A1 | 12/2017 | Li | |
| 2019/0156852 A1 | 5/2019 | Shi | |

FOREIGN PATENT DOCUMENTS

| | | |
|---|---|---|
| WO | 0041330 W | 7/2000 |
| WO | 2007021722 A2 | 2/2007 |
| WO | 2007130765 A2 | 11/2007 |

OTHER PUBLICATIONS

Contant, C. et al. "Error-dependent step-size control of adaptive normalized least-mean-square filters used for nonlinear acoustic echo cancellation" published Apr. 16, 2015, Signal, Image and Video Processing, vol. 10, pp. 511-518.

Gupta, V.K. et al. "Acoustic Echo and Noise Cancellation System for Hand-Free Telecommunication using Variable Step Size Algorithms" Radio Engineering, vol. 22, No. 1, Apr. 2013, pp. 200-207.

Kar, A. et al. "Dynamic Tap-Length Estimation Based Low Complexity Acoustic Echo Canceller" 2012 International Conference on Emerging Trends in Science, Engineering and Technology, Dec. 13-14, 2012, pp. 339-343.

Li, Ting-Ting, et al. "An Improved Variable Step-Size LMS Algorithm" 2011 7th International Conference on Wireless Communications, Networking and Mobile Computing, Sep. 23-25, 2011.

Rombouts, G. et al. "Robust and Efficient Implementation of the PEM-AFROW Algorithm for Acoustic Feedback Cancellation" Journal of the Audio Engineering Society, Audio Engineering Society, New York, NY, vol. 55, No. 11, Nov. 1, 2007 pp. 955-966.

Zhang, S. et al. "Robust Variable Step-Size Decorrelation Normalized Least-Mean-Square Algorithm and its Application to Acoustic Echo Cancellation" IEEE/ACM Transactions on Audio, Speech and Language Processing, vol. 24, Issue 12, Dec. 2016, pp. 2368-2376.

* cited by examiner

FILTER ADAPTATION STEP SIZE CONTROL FOR ECHO CANCELLATION

CROSS-REFERENCE TO RELATED APPLICATIONS

This application claims the benefit of US Provisional Patent Application No. 63/120,408, filed 2 Dec. 2020; U.S. Provisional Patent Application No. 62/990,870, filed 17 Mar. 2020; and U.S. Provisional Patent Application No. 62/949,598, filed 18 Dec. 2019, which are incorporated herein by reference.

FIELD OF INVENTION

This disclosure generally relates to audio signal processing (e.g., echo cancellation on an audio signal). Some embodiments pertain to performing echo cancellation with prediction filter adaptation in which adaptation step size (e.g., difference between successive estimates of sets of prediction filter coefficients) is controlled (e.g., to implement echo cancellation robustly and efficiently).

BACKGROUND

Herein we use the expression "echo cancellation" to denote suppression, cancelling, or other management of echo content of an audio signal.

Many commercially important audio signal processing applications (e.g., duplex communication and room noise compensation for consumer devices) benefit from echo cancellation. Echo management is a key aspect in any audio signal processing technology which requires duplex playback and capture, including voice communications technologies as well as consumer playback devices which have voice assistants.

Typical implementation of echo cancellation includes adaptation or one or more prediction filters. The prediction filter(s) take as input a reference signal, and output a set of values that is as close as possible to (i.e., has minimal distance from) the corresponding values observed in a microphone signal. The prediction is typically done using either: a single filter that operates (or a set of M filters that operate) on time domain samples of a frame of the reference signal; or one or more filters, each operating on data values of a frequency domain representation of a frame of the reference signal.

When the prediction is done on frequency domain data with a set of M prediction filters, the length of each of these filters is only 1/M of the length of the single time domain filter needed to capture the same range of delay. During adaptation, coefficients of the prediction filter(s) are typically adjusted by an adaptation mechanism to minimize the distance between the output of the prediction filter(s) and the input. A number of adaptation mechanisms are well known in the art (e.g., LMS (least mean squares), NLMS (normalized least mean squares), and PNLMS (proportionate normalized least mean squares) adaptation mechanisms are conventional).

As noted, an echo cancellation system may operate in the time domain, on time-domain input signals. Implementing such systems may be highly complex, especially where long time-domain correlation filters are used, for many audio samples (e.g., tens of thousands of audio samples), and may not produce good results.

Alternatively, an echo cancellation system may operate in the frequency domain, on a frequency transform representation of each time-domain input signal (i.e., rather than operating in the time-domain). Such systems may operate on a set of complex-valued band-pass representations of each input signal (which may be obtained by applying a STFT or other complex-valued uniformly-modulated filterbank to each input signal). For example, US Patent Application Publication No. 2019/0156852, published May 23, 2019, describes echo management (echo cancellation or echo suppression) which includes frequency domain adaptation of a set of prediction filters.

During echo cancellation, the need to adapt a set of prediction filters (e.g., using a gradient descent adaptive filter method) under any of a variety of signal and environmental conditions (e.g., in the presence of various types of noise) adds complexity to the adaptation process. Conventional methods for controlling adaptation step size introduce uncertainty (in the sense that when they are used, the adaptation may not converge, or may not reliably and sufficiently rapidly converge, under some conditions). It would be useful to perform echo cancellation (including adaptation of one or more prediction filters) with adaptation step size control such that the adaptation is robust (i.e., reliably and sufficiently rapidly converges, under a wide range of signal and environmental conditions, including in the presence of various type of noise) and efficient.

Notation and Nomenclature

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements echo cancellation may be referred to as an echo cancellation system, and a system including such a subsystem may also be referred to as an echo cancellation system.

Throughout this disclosure including in the claims, the term "processor" is used in a broad sense to denote a system or device programmable or otherwise configurable (e.g., with software or firmware) to perform operations on data (e.g., audio data). Examples of processors include a field-programmable gate array (or other configurable integrated circuit or chip set), a digital signal processor programmed and/or otherwise configured to perform pipelined processing on audio data, a graphics processing unit (GPU) configured to perform processing on audio data, a programmable general purpose processor or computer, and a programmable microprocessor chip or chip set.

Throughout this disclosure including in the claims, the term "couples" or "coupled" is used to mean either a direct or indirect connection. Thus, if a first device is said to be coupled to a second device, that connection may be through a direct connection, or through an indirect connection via other devices and connections.

Throughout this disclosure including in the claims, "audio data" denotes data indicative of sound (e.g., speech) captured by at least one microphone, or data generated (e.g., synthesized) so that said data are renderable for playback (by at least one speaker) as sound (e.g., speech). For example, audio data may be generated so as to be useful as a substitute for data indicative of sound (e.g., speech) captured by at least one microphone.

SUMMARY

In some embodiments, the invention is an echo cancellation method which includes adaptation of at least one prediction filter, with adaptation step size controlled using gradient descent on a set of filter coefficients (i.e., one or more filter coefficients) of the filter (i.e., on a set of filter coefficients of the filter which have been previously determined), where control of the adaptation step size is based at least in part on a direction of adaptation and a predictability of a gradient of adaptation.

In gradient descent adaptation, each adaption step determines an updated set of filter coefficients, $\theta_n$, from a previous (i.e., current) set of filter coefficients, $\theta_{n-1}$. Each adaptation step including subtraction of an updating term ($\sigma_n$) from the current set of filter coefficients: $\theta_n=\theta_{n-1}-\sigma_n$, where each updating term is determined at least in part by a gradient, $\partial f[\theta_{n-1}]/\partial\theta_{n-1}$, of a function, $f[\theta_{n-1}]$, of the set of filter coefficients. Herein, a "gradient of adaptation" denotes the gradient, $\partial f[\theta_{n-1}]/\partial\theta_{n-1}$, or a scaled (e.g., scaled and normalized) version of the gradient.

In cases in which the set of filter coefficients, $\theta_n$, comprises a plurality of coefficients, each of the function, $f[\theta_{n-1}]$, the gradient, $\partial f[\theta_{n-1}]/\partial\theta_{n-1}$, the set, $\theta_n$, and the updating term, $\sigma_n$, may be described as a vector, with each element of each vector corresponding to one of the coefficients. Each adaptation step size is the element of the vector, $\theta_n-\theta_{n-1}=\sigma_n$, which corresponds to one of the filter coefficients (or if the set of filter coefficients, $\theta_n$, consists of only one coefficient, the adaptation step size is the scalar value $\theta_n-\theta_{n-1}=\sigma_n$).

Typically, the adaptation is controlled to proceed rapidly (with relatively large step size) when the gradient of adaption is as expected (i.e., has high predictability) and to proceed slowly (with relatively small step size) when the gradient of adaption is not as expected (i.e., has low predictability). The gradient of adaptation typically depends on prediction error, and the prediction error is expected to decrease (in one direction) from adaptation step to adaption step. Thus, in typical embodiments, when the prediction error decreases (in one direction) as expected (e.g., under conditions of unexpected noise in the environment where the echo cancellation is performed), the adaptation is controlled to proceed more rapidly (with larger step size) than when the prediction error does not decrease (in one direction) as expected.

In some embodiments, the gradient of adaptation ($\partial f[\theta_{n-1}]/\partial\theta_{n-1}$) is normalized and is also scaled by a time-dependent factor (e.g., the below described time-varying weight s[t]), to control (or contribute to the control of) the adaptation step size based on predictability of the normalized, scaled gradient of adaptation. Some embodiments implement smoothing of a normalized gradient of adaptation, to improve control of the adaptation step size based on predictability of the smoothed gradient of adaptation.

In a first class of embodiments, each adaptation step (which determines an updated filter coefficient, a[t+1, k], in response to a filter coefficient a[t,k]) is:

$$a[t+1,k]=a[t,k]-(X[t]/N)\cdot(\partial|e[t]|^2/\partial a[k])$$

where "·" denotes multiplication, "k" is an index identifying one filter coefficient a[k] which is being updated at a sequence of different times (where a[t,k] denotes the value of a[k] at time t), X[t] is a time-varying weight, 1/N is a normalization factor, |e[t]| is absolute value of error e[t] at time t, and $\partial|e[t]|^2/\partial a[k]$ is the gradient of adaptation.

In the first class of embodiments, the time-varying weight X[t] typically increases adaptation step size (adaptation speed) at times when error is decreasing as expected, and typically decreases adaptation speed at times when error is not decreasing (in one direction) as expected (e.g., under conditions of unexpected noise in the environment in which the echo cancellation is performed). This is additional to the control provided by the normalization factor 1/N, since the normalization of the gradient of adaptation typically achieves faster adaptation (with convergence) under expected conditions (e.g., low unexpected noise conditions, when error is decreasing as expected over time), than would be achieved without the normalization.

A second class of embodiments implements adaptation with modified accelerated gradient (MGA) descent. In the second class of embodiments, each adaptation step (which determines an updated filter coefficient, a[t+1, n], in response to a filter coefficient a[t,n]) is:

$$a[t+1,n]=a[t,n]-\beta[n]\sigma[t+1,n]$$

where "n" is an index identifying one filter coefficient a[n] which is being updated at a sequence of different times (where a[t,n] denotes the value of a[n] at time t), and where β[n] is a time-index based weight. Optionally, the time-index based weighting is omitted (i.e., each β[n] may have the value 1). In the second class of embodiments, the updating term σ[t+1, n] is:

$$\sigma[t+1,n]=\gamma\sigma[t,n]+(\mu\cdot(\partial e^2[t]/\partial a[n]))/(f[t])^{1/2},$$

where γ is a smoothing factor, μ is a factor, $1/(f[t])^{1/2}$ is a normalization factor, $e^2[t]$ is squared error at time t, and $\partial e^2[t]/\partial a[n]$ is a gradient of adaptation. The MGA descent implements smoothing of the adaptation, with the smoothing factor γ controlling the amount of smoothing (i.e., γ=0 causes no smoothing), e.g., to compensate for unexpected or unpredictable noise conditions. The normalization of the gradient of adaptation typically achieves faster adaptation (with convergence) under expected conditions (e.g., low unexpected noise conditions, when error is decreasing as expected over time), than would be achieved without the normalization. Thus, the normalization avoids too-slow adaptation under normal or expected conditions (i.e., low noise conditions where the prediction error decreases over time as expected to approach the minimum).

In some embodiments of the invention, a time-index based weighting is employed. For example, the time-index based weighting may be implemented by weights β[n] as in the second class of embodiments, or by weights μ[k], with X[t] implemented as X[t]=μ[k]s[t], where s[t] is a time-varying weight, in the first class of embodiments. For example, where each coefficient being updated belongs to a filter (determined using a filterbank) identified by a value of filter tap index l, the weights μ(k) may depend on the filter tap index l of the filter which includes the coefficient (identified by index k) being adapted.

Nesterov Accelerated Gradient (NAG) adaptation with normalization of the gradient of adaptation may achieve fast convergence under expected echo cancellation conditions (e.g., under normal, or expected, low noise conditions), with adequate convergence under other conditions (e.g., under high, unexpected noise conditions). NAG adaption by itself (i.e., without normalization) would often be too slow under many operating conditions of an echo canceller. Normalizing the gradient of adaptation (in gradient adaption other than NAG adaption) by itself might provide fast convergence at a cost of more inaccuracy (e.g., under unexpected noise conditions) as the adaptation approaches the target.

In accordance with typical embodiments, adaptation of prediction filter coefficients during echo cancellation can be controlled to be not only computationally efficient but also robust in the sense that the adaptation converges reliably and sufficiently rapidly, under a wide range of signal and environmental conditions (e.g., in the presence of various types and amounts of noise).

Aspects of the invention include a system configured (e.g., programmed) to perform any embodiment of the inventive method or steps thereof, and a tangible, non-transitory, computer readable medium which implements non-transitory storage of data (for example, a disc or other tangible storage medium) which stores code for performing (e.g., code executable to perform) any embodiment of the inventive method or steps thereof. For example, embodiments of the inventive system can be or include a programmable general purpose processor, digital signal processor, GPU, or microprocessor, programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto. Some embodiments of the inventive system can be (or are) implemented as a cloud service (e.g., with elements of the system in different locations, and data transmission, e.g., over the internet, between such locations).

DETAILED DESCRIPTION

Efficient acoustic echo cancellation technologies can utilize gradient descent on a set of filter coefficients to theoretically arrive at (i.e., determine by filter adaptation) a best set of echo cancellation filters (where the set includes one or more echo cancellation filters), which minimizes a prediction error (e.g., as determined by a least squares method). In different embodiments of the present invention, different gradient descent methods (e.g., methods using normalization and/or smoothing of gradient vectors) are used to adapt at least one filter (i.e., to step through a sequence of states of the filter) to achieve better approximations to a best version (e.g., having minimized prediction error) of the filter. In a class of embodiments, the filter adaptation step size is controlled using gradient descent (e.g., with smoothing of a normalized gradient vector).

Typical echo cancellation presents an adaptive filtering problem. A challenge in echo cancellation is that there are multiple sources that the microphone is able to hear, but a typical echo cancellation system (for use in or with a device including at least one microphone and at least one loudspeaker) is intended to cancel only some of them. For example, in a conference phone use-case, an echo cancellation system may be designed to predict the linear component of the device's speaker but the microphone could (for example) be receiving utterances by people speaking in the vicinity of the microphone and non-linearities produced by the device's speaker. Given a signal being sent to a speaker (in a room or other environment) and a signal being received by a microphone (in the environment), echo cancellation must address the question: how does one form a filter (or set of filters) that will predict the signal in the microphone based on the signal sent to the speaker? If the echo cancellation system can determine such a filter, the filter can be used to subtract the predicted signal from the microphone signal to determine the remaining signal in the room (or other environment).

Figure 1:
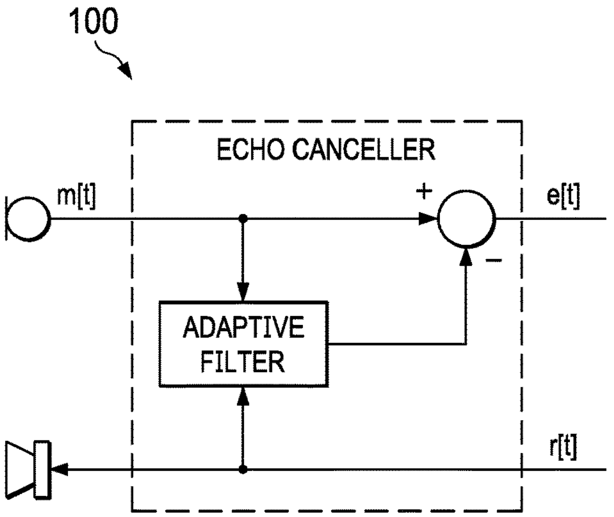
FIG. 1 is a block diagram of elements of an example echo cancelling system implementing prediction filter adaptation.

With reference to FIG. 1, in an example echo cancelling system, m[t] is the microphone signal captured by a microphone, r[t] is the reference signal sent to a speaker, and e[t] is an error signal generated by subtracting a filtered version of the reference signal from the microphone signal m[t]. The element labeled "adaptive filter" may determine a filter a[t] having filter coefficients, and applies this filter to the reference signal r[t] to generate the signal which is subtracted from the microphone signal m[t]. At each of a sequence of different times, t, the filter is adapted (updated with adaptive filter step size control which may be implemented in accordance with an embodiment of the invention) to minimize the error e[t]. The updated filter (determined for each time t) may then be used to filter the microphone signal (to suppress or cancel echo content of the microphone signal). The updated filter may be used until a newly updated version thereof is determined (at the next time in the sequence of times).

An example of the error e[t] is as follows:

$$e[t] = m[t] - \sum_{k=-\infty}^{\infty} a[k]r[t-k]$$

If the filter is implemented in the time-domain, the filter would need to contain many coefficients to be useful. Adapting such a large filter is computationally expensive and algorithmically difficult to produce fast convergence. It is typically preferable to employ set of M filters (where M is a number), each of which is a small filter for filtering a subset of the data values of a frequency domain representation of a segment (e.g., frame) of the reference signal. Thus, typical embodiments of the invention utilize a filterbank, e.g., a short-time Fourier transform (STFT) or a near-perfect reconstruction DFT filterbank, to replace a large time-domain filter of the noted type with (i.e., by effectively breaking the large filter down into) a number of (e.g., many) smaller filters (each having a different index l), making the filter adaptation problem how to determine, typically in the frequency-domain (for each time, t, in the sequence of times), a best set of filter coefficients, $a_l$ (written in the following equation as "$a_l[k]$") for each value of index l:

$$e_l[t] = m_l[t] - \sum_{k=-\infty}^{\infty} a_l[k] r_l[t-k]$$

where l is the index of the filterbank component (the "l"th filter). In other words, the output of the filterbank is a set of filters, each identified by a different value of the index l. Adaptation of these filters at each time t, includes minimizing an error $e_l[t]$ for each of the filters, to determine an updated set of the filters for the time t.

If it is assumed that there is no other noise in the room (or other environment), we can treat the magnitude of e[t], or each error $e_l[t]$, as an objective function to minimize and perform gradient descent over an initial set of filter coefficients (e.g., an initial set of coefficients $a_l$) to find a best set of filter coefficients (e.g., a best set of coefficients $a_l$) for the time t. Typically, however, there are other noise sources in the room (possibly including other people talking) to which we do not want any filter to adapt. It is typically undesirable to attempt to create a filter that would not only attempt to predict desired content (e.g., utterances of a user which are captured by the microphone) but to predict all other audio sources as well. Various techniques have been proposed for filter adaptation in echo cancellers which avoid attempting to adapt to audio other than desired content (e.g., utterances of a user which are captured by the microphone).

Once the filter coefficients have adapted reasonably at time t, the error e[t] (or each error $e_l[t]$) is indicative of the unpredictable component of the speaker signal plus the audio in the room (or other environment). The unpredictable component is hopefully substantially lower in level than the speaker signal itself, but still normally needs to be further suppressed using other mechanisms.

Figure 2:
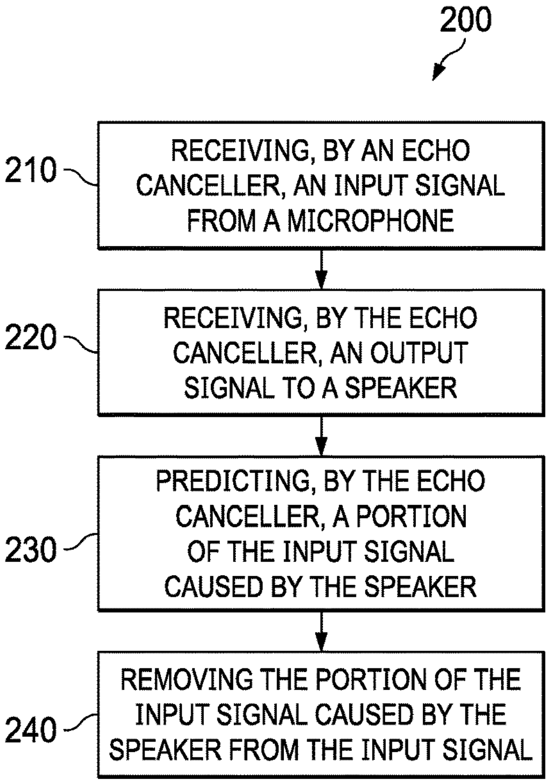
FIG. 2 is a flowchart of an example echo cancellation process which includes prediction filter adaptation (e.g., with adaptation step size control in accordance with an embodiment of the invention).

Next, with reference to FIG. 2, we describe an example of echo cancellation in accordance with a class of embodiments of the invention. FIG. 2 is a flowchart of an example echo cancellation process 200 which includes adaptive filter step size control. Process 200 can be performed by a system, e.g., an echo canceller, including one or more processors.

In process 200, the echo canceller receives (in step 210) an input signal from a microphone, and the echo canceller receives (in step 220) an output signal to a speaker (a speaker feed signal). Typically, the speaker and the microphone are implemented in a single device. The echo canceller predicts (in step 230) a portion (i.e., content) of the input signal (the signal captured by the microphone) caused by the speaker (i.e., resulting from sound emitted by the speaker and captured by the microphone). The predicting (step 230) includes configuring (including initializing and adapting) an adaptive filter based on the input signal and the output signal. The configuring may include scaling (or otherwise controlling) an adaptation rate of the adaptive filter in accordance with an embodiment of the invention (e.g., based on at least one of an index of a filter tap or energy of an error signal, as described below). The echo canceller removes (in step 240) the portion of (i.e., content of) the input signal caused by the speaker from the input signal.

In some implementations of process 200, step 230 includes adapting a set of filters (each filter including coefficients having different values of a filter tap index), and the adaptation rate is controlled (in accordance with an embodiment of the invention) to be slower for increasing values of the filter tap index. In some implementations of process 200, adaptation rate for at least one filter is controlled (in accordance with an embodiment of the invention) to increase in response to a decrease in the energy of the error signal, and to decrease the adaptation rate in response to an increase in the energy of the error signal. Typically, the adaptation rate is allowed to increase up, and to decrease down, to a respective limiting value.

Filter adaptation in accordance with some embodiments of the invention uses gradient descent. Using gradient descent to build (adapt) an adaptive filter relies on being able to compute the partial derivatives of an error function for each filter coefficient. The filter coefficients are then moved (changed) during adaptation by some value that is dependent on the partial derivatives, i.e.:

$$a[t+1, k] = a[t, k] - \mu \frac{\partial |e[t]|^2}{\partial a[k]}$$

where here, "k" identifies the filter coefficient being adapted (i.e., the "k"th filter coefficient is being adapted), and "μ" is scaling factor. In some embodiments, a plurality of different filters exist (and undergo adaptation), each filter consisting of coefficients corresponding to different filterbank taps, with each of such coefficients identified by a different value of a filter tap index "l".

If the factor μ is made to be too large (for adaptation in accordance with the above equation), the filter may not converge even for well-behaved input. If μ is too small, the filter will adapt very slowly. As the filter approaches (during adaptation) a minimum of the error function, the partial derivatives become small creating even slower convergence. A known method for attempting to address this is to employ another dynamic weighting (a normalization factor) during the adaptation, for example, the square root quantity in the denominator of the following equation:

$$a[t+1, k] = a[t, k] - \frac{\mu}{\sqrt{\sum_n \left| \frac{\partial |e[t]|^2}{\partial a[n]} \right|^2}} \frac{\partial |e[t]|^2}{\partial a[k]}$$

In the above equation, the index "n" ranges over all values of index k, so that the summation is over all available values of k (all the filter coefficients which are being adapted). The equation determines an updated value of one of the filter coefficients (which has one index "k").

In the equation of the previous paragraph, μ becomes related to the maximum absolute value that a single coefficient could change per iteration of adaptation. The method may work well until signals are introduced (i.e., noise is introduced) at the microphone that are correlated to the audio the device is playing back (for example: a person talking near the device while the speaker is also playing speech).

Next we describe two example embodiments of the inventive method, which address this limitation of the above-described adaptation method.

In the two example embodiments, a step of adaptation of a filter is for (occurs at) a time, t+1, assuming that the filter has been adapted (or initialized) at an earlier time, t. Typically, adaptation is performed many times (each occurrence starting at a different time). In the examples, the index "k" denotes which filter coefficient is being adapted (i.e., the equations pertain to a "k"th filter coefficient which is being adapted). Typically a plurality of different filters exists, each corresponding to a different filterbank tap identified by a different value of an index "l". The notation a[t,k] denotes a coefficient of one filter, which has been adapted (or initialized) at time t. Each ("k"th) filter coefficient is adapted in the manner to be described with reference to the coefficient value a[t,k]. Typically, each filter being adapted includes only a small number of coefficients (which may be identified by different values of a filter tap index "l"), making it stable to construct. In the first example embodiment, each filter being adapted consists of 8 coefficients, each coefficient corresponding to a different filterbank tap identified by a different one of 8 values of index "l".

First Example: Scaling μ Based on the Index of the Filter Tap

The first example embodiment recognizes the fact that the shape of each echo cancellation filter over time should be decaying in any usual environment (it is not expected that the echo cancellation is or will be performed in environments where the echo increases in intensity over time). Rather than let all filter coefficients move at the same speed (during adaptation), we permit coefficients nearer to time-zero to move faster than coefficients further away in time. Thus, to handle situations where the microphone signal is indicative of other data (which could cause the below-defined partial derivatives to attempt to drag the filter into a non-decaying shape during adaptation), a weighting factor (μ[k]) is introduced which penalizes attempting to build a filter that does not decay.

In this example, the weighting factor μ in the previous equation is replaced by a set of weighting factors μ[k]. The example assumes that each filter being adapted consists of 8 coefficients, each corresponding to a different filterbank tap identified by a different value of index "l". Each of the factors μ[k] pertains to (and is for use in adapting) coefficients identified by a different value of the index l.

In a typical implementation of the example embodiment, the inventive echo canceller operates using a filterbank which decimates the audio signals by 20 ms. For each filterbank band, there is an adaptive filter of 8 complex taps (each "tap" being identified by a different value of the index l) giving the canceller the ability to cancel around 160 milliseconds of echo. A suitable set of the weighting factors μ[k] for these filters is:

μ[k]=0.004 for filter coefficients having tap index l=0;
μ[k]=0.004 for filter coefficients having tap index l=1;
μ[k]=0.002 for filter coefficients having tap index l=2;
μ[k]=0.001 for filter coefficients having tap index l=3;
μ[k]=0.0004 for filter coefficients having tap index l=4;
μ[k]=0.0004 for filter coefficients having tap index l=5;
μ[k]=0.0001 for filter coefficients having tap index l=6;
μ[k]=0.0001 for filter coefficients having tap index l=7.

In variations on this example set of weighting factors μ[k], other values of the weighting factors μ[k] are employed. Typically, the weighting factors for filter taps having lower values of the index l are greater than (or equal to) those for higher values of the index l.

The weighting factors μ[k] may be applied in each filter adaptation step performed according the second example embodiment described below. For example, in the equation below for an adaptation step of the second example embodiment, the weighting factors μ[k] are employed as indicated in the numerator (of the last term on the right side of the equation), multiplied by a factor s[t], and divided by a normalization factor (the square root quantity in the denominator of the last term on the right side of the equation). In variations on this example, one or both of the factor s[t] and the normalization factor are omitted (i.e., replaced by the value "one").

Second Example: Scaling μ Dynamically Based on the Energy of the Error Signal e[t]

The second example embodiment is an example of gradient descent adaptation. The second example embodiment employs a time-varying weight s[t] which is modified in accordance with the amount and direction in which the prediction error is moving. Typically, it also employs the weighting factors μ[k] described above, though these factors may be omitted (i.e., replaced by factors having the values "one") in some cases. In the second example embodiment, the filter adaptation step (which determines an updated filter coefficient,
a[t+1, k], in response to a filter coefficient a[t,k]) is:

$$a[t+1,k] = a[t,k] - \frac{\mu[k]s[t]}{\sqrt{\sum_n \left|\frac{\partial\|e[t]\|^2}{\partial a[n]}\right|^2}}\frac{\partial\|e[t]\|^2}{\partial a[k]}$$

where, in a typical implementation, s[t] is defined as:

$$s[t] = \begin{cases} \min(s[t-1]\alpha, \gamma), & \text{if } \|e[t]\| < \|e[t-1]\|. \\ \max(s[t-1]\beta, \delta), & \text{otherwise.} \end{cases}$$

In the above equations, α, β, γ and δ are configurable parameters, and the index "n" ranges over all values of index k. Thus, the summation in the denominator (i.e., the normalization factor) is over all the coefficients (each identified by a different value of k) which are being adapted. More specifically, the summation is over partial derivatives of squared error for all values of index k. Each filter coefficient being adapted is identified by a value of index "k", and different values of factor "μ[k]" typically correspond to different filterbank taps (having filter tap index l).

When there is no audio stimulus (captured by the microphone) apart from that which is produced by the device's loudspeaker, we expect that the error e[t] should be reducing for most times (during a sequence of filter adaptation steps) as the filter coefficients, a, of all the filters move towards a result. Thus, the parameter α in the expression for s[t] is preferably set to a value slightly above 1 to increase the adaptation step size when the indicated condition (the absolute value of e[t] is less than the absolute value of e[t−1]) is being met. When there is such audio stimulus, we expect the opposite to be true: more often than not, the error will be increasing over time. Thus, the parameter β in the expression for s[t] is preferably set to a value slightly less than 1 to decrease the step size when the corresponding condition is being met. The step size range is limited by choice of specific values of parameters γ and δ. In an implementation, given the 8 example values for μ[k] set forth above, the values of α, β, γ and δ may be 1.01, 0.99, 0.005 and 8.0 respectively.

In the example embodiment, s[t] has a relatively large value when the absolute value of the error e[t] is decreasing (i.e., is less than the absolute value of the error e[t−1]). A larger value of s[t] (and/or a larger value of μ[k]) tends to increase the speed of adaptation (i.e., to increase the adaptation step size), and a smaller value of s[t] (and/or μ[k]) tends to decrease the speed of adaptation (i.e., to decrease the adaptation step size). This has the effect of dropping the step size towards zero when there is potentially double-talk occurring (e.g., when the error e[t] is not decreasing over time), which prevents the filter coefficients, a, from changing rapidly. When environmental conditions are good, the example embodiment permits the adaptation step size to increase and the adaptation thus to move quickly (to improve adaptation times).

Figure 3:
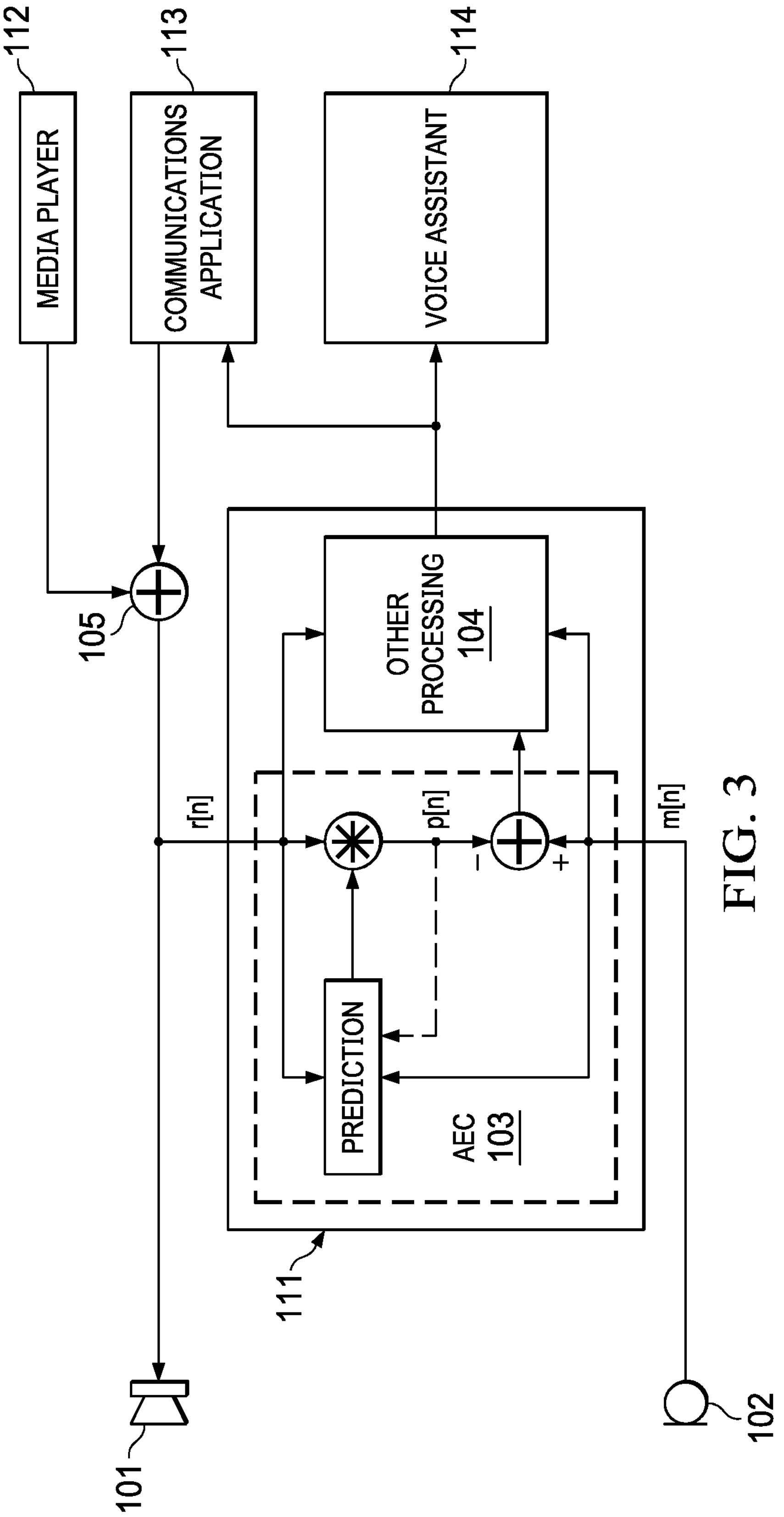
FIG. 3 is a block diagram of an example echo cancelling system which may implement an acoustic echo cancellation algorithm with filter adaptation in accordance with an embodiment of the invention (e.g., using smoothing of normalized gradient vectors).

FIG. 3 is a block diagram of an example echo cancelling system, which may implement an embodiment of the inventive acoustic echo cancellation algorithm (e.g., an embodiment in which filter adaptation is performed using gradient descent adaptation, e.g., using smoothing of normalized gradient vectors).

The system of FIG. 3 may be a communication device including a processing subsystem (at least one processor which is programmed or otherwise configured to implement audio processing subsystem 111, communication application 113, media player 112, and voice assistant 114), and physical device hardware (including loudspeaker 101 and microphone 102) coupled to the processing subsystem. Typically, the system includes a non-transitory computer-readable medium which stores instructions that, when executed by the at least one processor, cause said at least one processor to perform an embodiment of the inventive method.

Audio processing subsystem 111 (e.g., implemented as an audio processing object) may be implemented (i.e., at least one processor of the FIG. 3 system is programmed to execute subsystem 111) to perform an embodiment of the inventive echo cancellation method. subsystem 111 is configured to generate (e.g., implements a filterbank which generates) or receive frequency-domain playback audio data indicative of audio content of a playback audio signal (a speaker feed, sometimes referred to herein as a "reference" signal) which is provided to loudspeaker 101, and frequency-domain microphone data indicative of audio content of a microphone signal output from microphone 102.

Subsystem 103 (labelled "AEC" in FIG. 3) of subsystem 111 is an echo cancellation subsystem configured to perform echo cancellation (e.g., an embodiment of the inventive acoustic echo cancellation algorithm). Subsystem 111 is also implemented (e.g., it includes voice processing subsystem 104 which is implemented) to perform other audio processing on the output of echo cancellation subsystem 103.

Subsystem 111 may be implemented as a software plugin that interacts with audio data present in the FIG. 3 system's processing subsystem.

In a typical implementation of FIG. 3, time-domain reference audio data r[n], comprising samples of the reference signal provided to speaker 101, and time-domain microphone audio data m[n], comprising samples of the microphone signal output from microphone 102, are provided to subsystem 111. A subsystem (the subsystem labeled "Prediction" in FIG. 3) of echo cancellation subsystem (echo canceller) 103 implements a filterbank which performs a time-domain to frequency-domain transform on data r[n], and a time-domain to frequency-domain transform on data m[n], and generates an initial set of prediction filters (each having a different index l). Each of the prediction filters comprises an initial set of filter coefficients $a_l[k]$. Subsystem 103 is configured to determine, in the frequency-domain (for each time, t, in a sequence of times), a best set of filter coefficients $a_l[k]$ for each value of index l, by performing adaptation on the initial set of filter coefficients for said value of index l.

Echo cancellation is performed in response to the reference signal (a speaker feed indicative of audio content to be played out of speaker 101) and microphone signal (indicative of audio content captured by microphone 102). The microphone signal may undesirably contain audio content which was emitted from speaker 101. Typically, the output of echo canceller 103 is an echo-managed version of the microphone audio, which desirably has as much of the speaker audio removed from it as is possible or practical. The output of echo canceller 103 is provided to communications application 113 and optionally also to voice assistant 114.

The echo cancellation process is typically implemented in a manner including trying to estimate a filter (or each of a set of filters) which map(s) reference audio (content of the reference signal) to microphone audio (content of the microphone signal). More explicitly, each filter is determined by an adaptation process in an effort to determine an adapted filter which can filter audio data indicative of audio content that has been sent to the speaker (the reference audio), where the adaptation attempts to determine a linear combination of values (a filtered version of the reference audio, sometimes referred to as estimated echo) that best estimates the microphone audio. The microphone audio is then filtered using the adapted (estimated) filter(s), in an effort to subtract the estimated echo from the microphone audio.

Low-complexity solutions to echo cancellation use a gradient descent technique (e.g., an embodiment of the inventive filter adaptation method) to find out how to update (adapt) each prediction filter in such a way that a cost function is minimized. The cost function is normally defined as the squared error between an estimated echo signal (the filtered version of the reference audio) and the microphone audio. Gradient descent normally assumes that there is a linear relationship between the input and output audio, but this is never the case in a real device due to non-linearities in the system and other noise sources being present, and this impedes these techniques from producing good output. There are many ways to perform each filter update (i.e., adaptation of a filter to produce an updated filter) and the updating method can be selected to optimize different aspects of the canceller (e.g., with the optimization considering how fast is the echo canceller at finding a reasonable filter, and/or how much of the echo the filter is able to reduce). Embodiments of the inventive method disclosed herein typically implement filter adaptation so that the filter adapts at a desirable rate (e.g., fairly quickly) and robustly, so that the adapted filter is capable of producing a desirable amount of echo suppression.

Still with reference to FIG. 3, the reference audio r[n] which is played back via speaker 101, is taken from mixer 105, which may receive audio from a number of sources. The echo cancellation is performed in response to the microphone audio m[n] from microphone 102, and the reference audio r[n].

Subsystem 103 (the area enclosed by the dotted lines in subsystem 111) is an echo canceller. It can be seen that the echo canceller takes the microphone and reference audio into a "prediction" block which creates filter coefficients by which the reference audio is filtered to produce p[n], which is the predicted signal. This signal is then subtracted from the microphone signal to produce the echo cancelled output. Taken alone, the echo cancelled signal may still not be suitable for voice communications and may need to be further "cleaned up" to remove noise and components of echo that were not able to be removed by the canceller. Such additional processing may be performed in block (voice processing subsystem) 104 in typical implementations of the FIG. 3 system. The resulting output audio is then delivered to communications application 113 and/or voice assistant 114. Additionally, the configuration of the system may benefit from operating in a different configuration if the application wanting the audio output is a voice assistant than if a communications application is to receive the output audio.

We next describe example embodiments of the inventive echo cancellation method which use a gradient descent filter adaptation method (which controls adaptation step size) to implement adaptation of at least one prediction filter (e.g., a set of prediction filters). The example embodiments may be implemented by echo cancellation subsystem 103 of the FIG. 3 system or by other embodiments of the inventive system.

Gradient descent adaptation takes a function $f(\theta)$ of some parameter vector $\theta$ (e.g., a vector of parameters which are prediction filter coefficients) and uses gradient(s) of the function with respect to one or more of the parameters (e.g., one or more filter coefficients) to adjust a current estimate of at least one (e.g., all) of the parameter(s) to approach some minimum. Although the parameter vector $\theta$ may consist of a plurality of parameters (e.g., in some embodiments of the invention it consists of a plurality of filter coefficients, each of which is a coefficient of a different prediction filter), in some cases it may consist of only one parameter (a filter coefficient). More specifically, although echo cancellation may include adaptation of a set of coefficients of a set of filters (e.g., with each filter identified by a different value of an index l, as described above) some of the description herein of gradient descent embodiments expressly describes adaptation of only one coefficient of one such filter (e.g., at each time t, of a sequence of times, including by minimizing an error e[t] for the coefficient) although the adaptation may include normalization by a factor determined from a plurality of filter coefficients. In cases in which a plurality of filter coefficients (e.g., a vector of coefficients of a plurality of prediction filters) is to be updated at each time, each of the coefficients may be adapted in the manner described herein.

In gradient descent adaptation implemented in an acoustic echo canceller, the function $f(\theta)$ may be defined such that it is the square of total error of the predicted signal (a filtered version of the content of the speaker feed being delivered to the speaker) subtracted from the microphone signal, where the parameters comprising vector $\theta$ are coefficients of a prediction filter (or set of prediction filters). We sometimes use the expression $e^2[t]$ to denote the squared total error between the microphone signal m[t] and a filtered version of the audio r[t] being delivered to the speaker, where a[t] are the prediction filter coefficients (applied to r[t] determine the filtered version of r[t]). Although the error function $e^2[t]$ is a function of time, we sometimes refer to it as $e^2(\theta)$, since theta ($\theta$) may be a vector of filter coefficients a[t] at time t.

When performing some implementations of gradient descent to adapt a set of prediction filter coefficients, each step of adaptation includes subtraction of a gradient (partial derivative) of the function $f(\theta)$ with respect to the vector $\theta$, or subtraction of a gradient of a modified (e.g., scaled, weighted, and/or smoothed) version of the gradient of the function $f(\theta)$, in an effort to "step" towards zero error. In other words, each step of gradient descent adaptation (of a current set of prediction filter coefficients $\theta_n$) may determine a set of updated filter coefficients $\theta_{n+1}$ as follows:

$$\theta_{n+1}=\theta_n-\mu\cdot\partial f(\theta_n)/\partial\theta_n$$

where $\mu$ is a factor (e.g., a weighting factor or a weighting and normalization factor). Each of the function $f(\theta_n)$ and the partial derivative $\partial f(\theta_n)/\partial\theta_n$ is also a vector, having the same number of elements as the vector of filter coefficients $\theta_n$. In the equation, the index "n" denotes a time (one of a sequence of updating times).

Various methods have been proposed for controlling the adaptation step size, $\theta_{n+1}-\theta_n$ (depending on the range of index n, this may alternatively be written as $\theta_n-\theta_{n-1}$), in gradient descent filter adaptation.

We next describe three classes of these methods. In each example method, each updated vector, $\theta_n$, of filter coefficients is determined from the previous (i.e., current) vector $\theta_{n-1}$ of filter coefficients by subtracting a vector ($\sigma_n$) from the current set (vector) of filter coefficients:

$$\theta_n=\theta_{n-1}-\sigma_n.$$

The three examples of gradient descent filter adaptation differ in how the vector $\sigma_n$ is defined.

The three examples of determination of the vector $\sigma_n$ are as follows:

1. $\sigma_n=\mu\cdot\partial f[\theta_{n-1}]/\partial\theta_{n-1}$ where "·" denotes multiplication, $\mu$ is a factor, $f[\theta_{n-1}]$ is a function of $\theta_{n-1}$, and $\partial f[\theta_{n-1}]/\partial\theta_{n-1}$ is the partial derivative of $f[\theta_{n-1}]$ with respect to $\theta_{n-1}$;

2. $\sigma_n=(\mu\cdot\partial f[\theta_{n-1}]/\partial\theta_{n-1})/\|\partial f[\theta_{n-1}]/\partial\theta_{n-1}\|$ where "·" denotes multiplication, $\mu$ is a factor, $f[\theta_{n-1}]$ is a function of $\theta_{n-1}$, and $\partial f[\theta_{n-1}]/\partial\theta_{n-1}$ is the partial derivative of $f[\theta_{n-1}]$ with respect to $\theta_{n-1}$. Since $\theta_{n-1}$ is a vector (consisting of one or more filter coefficients) the term $\partial f[\theta_{n-1}]/\partial\theta_{n-1}$ is a vector consisting of elements, where each of the elements is a partial derivative of $f[\theta_{n-1}]$ with respect to a different one of the filter coefficients. The quantity "$\|\partial f[\theta_{n-1}]/\partial\theta_{n-1}\|$" in the denominator is a normalization factor (e.g., the square root of the sum (over all values of index x) of $|\partial f[\theta_{x-1}]/\partial\theta_{x-1}|^2$, where each $\theta_{x-1}$ is one of the filter coefficients comprising the vector $\theta_{n-1}$, and each different value of the index x identifies a different one of the filter coefficients); and 3. $\sigma_n=\gamma\sigma_{n-1}+\mu\cdot\partial f[\theta_{n-1}-\gamma\sigma_{n-1}]/\partial\theta_{n-1}$ where "·" denotes multiplication, $\gamma$ and $\mu$ are factors, $f[\theta_{n-1}]$ is a function of $\theta_{n-1}$, and $\partial f[\theta_{n-1}]/\partial\theta_{n-1}$ is the partial derivative of $f[\theta_{n-1}-\gamma\sigma_{n-1}]$ with respect to $\theta_{n-1}$.

As noted, in each gradient descent adaptation step, $\theta_n=\theta_{n-1}-\sigma_n$, the next set of filter coefficients $\theta_n$ (i.e., the prediction filter coefficient(s) for time "n") is obtained by subtracting vector $\sigma_n$ from the current set of filter coefficients $\theta_{n-1}$.

The first method for determining $\sigma_n$ (numbered "1" above) is classical stochastic gradient descent, in which each of the gradients is scaled by a factor $\mu$. Once the error function $f[\theta_{n-1}]$ starts approaching zero during adaptation, the parameters (filter coefficients $\theta_n$) move by increasingly smaller amounts from step to step. However, this method is known to adapt slowly. For cases where the system is dynamic (e.g., when the adaptation is performed to update a prediction filter of an echo canceller), it will typically perform poorly and never obtain a good result due to noise in the optimization path.

The second method for determining $\sigma_n$ (numbered "2" above) normalizes the gradient vector, $\partial f(\theta_{n-1})/\partial\theta_{n-1}$, and scales the normalized gradient vector by a factor $\mu$. In this case, the factor $\mu$ provides a way to trade off adaptation speed with adaptation accuracy. Care needs to be taken to limit the value of μ to ensure the system remains stable while not choosing it to be so small that the system does not adapt well.

The third method for determining $\sigma_n$ (numbered "3" above) is known as the Nesterov Accelerated Gradient method. This method applies smoothing (which may be thought of as applying momentum) by including the additive term $\gamma\sigma_{n-1}$ and replacing the gradient vector $\partial f(\theta_{n-1})/\partial\theta_{n-1}$ by the gradient vector $\partial f(\theta_{n-1}-\gamma\sigma_n)/\partial\theta_{n-1}$. Rather than find the gradients (derivative parameters) based on their current values, this method determines the derivatives assuming that they have continued to move some distance ahead in their current direction—which they will do as they are effectively being smoothed which can be seen from the dependency of $\sigma_n$ on its previous value $\sigma_{n-1}$.

We next describe an embodiment (a modified gradient acceleration or "MGA" embodiment) of the inventive filter adaptation method, which implements a modification of the Nesterov Accelerated Gradient (NAG) method to optimize (i.e., perform adaptation on a current set of) the prediction filter coefficients $\theta_{n-1}$ to be optimized. This embodiment is a modified version of the above-described third method for choosing $\sigma_n$, in which the gradient vector $\partial f(\theta_{n-1}-\gamma\sigma_{n-1})/\partial\theta_{n-1}$ is not merely scaled by a rate factor μ but is scaled by a quantity μ/N, where μ is a rate factor and 1/N is a normalization factor. We next describe the MGA embodiment in more detail.

In the MGA embodiment, the error signal is defined as:

$$e[t]=m[t]-p[t]$$

where p[t] is the predicted signal (i.e., the signal that predicts the microphone signal m[t] from the speaker signal). In some filter adaptation implementations, the predicted signal is defined (as it was above) as:

$$p[t]=\sum_{k=-\infty}^{\infty} a[t,k]r[t-k]$$

where a[t,k] are the prediction filter coefficients, and r[t] is the speaker feed being sent to the speaker.

In the example MGA embodiment now being described, we modify this definition to instead define the error signal p[t] as:

$$p[t]=\sum_{k=-\infty}^{\infty} (a[t,k]\Upsilon\sigma[t,k])r[t-k]$$

where a[t,k] are the prediction filter coefficients, r[t] is the speaker feed being sent to the speaker, σ is the vector subtracted from a current set (vector) of prediction filter coefficients (which is identified above as $\theta_{n-1}$) to determine an updated vector (which is identified above as $\theta_n$) of prediction filter coefficients, and where γ is a smoothing factor (i.e., there is no smoothing in the case that γ=0).

In the above general description of the Nesterov Accelerated Gradient (NAG) adaptation technique, the updating vector $\sigma_n$ is defined using the index "n" to denote an update time, so that $\sigma_n$ denotes a vector at an update time (where the vector has a component for each filter coefficient being updated at the time), and $\sigma_{n+1}$ denotes the vector at a next update time (where the vector has a component for each filter coefficient being updated at the next update time). To complete the description of the example MGA embodiment of the invention, we use for convenience a different notation "σ[t,n]" to denote the elements of each updating vector. More specifically, the updating vector (at a time t) consists of a number of elements, and each element of the updating vector at time t, is "σ[t,n]" in the new notation, where the index "n" distinguishes between elements of the same updating vector. In the new notation, the updating vector whose elements are σ[t,n] corresponds to the above-defined updating vector $\sigma_n$, where the index "n" in "$\sigma_n$" denotes a time.

Using the new notation, we assume that at a time t, a set (vector) of prediction filter coefficients (each identified by a different value of index n) is being adapted. Each prediction filter coefficient is "a[t,n]." Thus, in the new notation, σ[t,n] is the element of the updating vector employed to update the filter coefficient "a[t,n]."

Using the new definition of p[t], $$p[t]=\sum_{k=-\infty}^{\infty} (a[t,k]-\Upsilon\sigma[t,k])r[t-k]$$

the error term $e^2[t]$ is:

$$e^2[t]=(m[t]-p[t])^2.$$

For simplicity, each filter coefficient a[t,n] is written as "a[n]" in the following discussion. Thus, $\partial e^2[t]/\partial a[n]$ is the partial derivative of the squared error $e^2[t]$ at time t with respect to the coefficient a[n] at time t. This partial derivative is:

$$\frac{\partial e^2[t]}{\partial a[n]}=2r[t-n](p[t]-m[t])=-2r[t-n]e[t]$$

where "r[t]" denotes the speaker feed filtered by the prediction filter, and "m[t]" denotes the microphone signal.

For convenience, we define a normalization quantity $f[t]$ as:

$$f[t]=\sum_{k=-\infty}^{\infty} \left(\partial e^2[t]/\partial a[k]\right)^2$$

In the definition of normalization quantity, $f[t]$, the summation is over the partial derivatives for all the prediction filter coefficients a[n] (i.e., the summation index k ranges over all possible values of index "n" identifying the filter coefficients a[n]). Though the summation notation contemplates that there may be an infinite number of values of index k, in practical implementations, there are only a finite number of values of the index k.

In the example MGA embodiment, using the new notation for the updating vector elements σ[t,n], and the above-defined normalization quantity $f[t]$, the updating vector element, σ[t+1,n], for updating (at a time t+1) the filter coefficient a[n] (determined for previous time t) is:

$$\sigma[t+1,n]=\gamma\sigma[t,n]+(\mu\cdot(\partial e^2[t]/\partial a[n]))/(f[t])^{1/2},$$

where the symbol "·" denotes multiplication, σ[t,n] is the updating vector element being updated (the updating element employed at the previous time t), γ is a smoothing factor (i.e., there is no smoothing in the case that γ=0), μ is a rate factor, and $(f[t])^{-1/2}$ is a normalization factor. Suitable values for the rate factor μ and the smoothing factor γ are 0.005 and 0.6, respectively, assuming that the adaptation occurs 50 times per second for moderate digital signal levels for the microphone and reference.

In general, the same rate factor μ may be employed for each filter coefficient, or a different value of the rate factor μ may be employed for each filter coefficient (so that μ in the equation in the previous paragraph may be written as "μ[n]" to denote explicitly the rate factor for the "n"th filter coefficient). For example, each rate factor μ[n] may be one of the above-described weightings μ[k] (where in the above description of weightings μ[k], the index k identifies a filter coefficient of a filter having a tap index l). Alternatively or additionally, another weighting (e.g., time-index based weighting using below-described weights β[n]) may be applied to each updating element σ[t+1, n] during adaptation, where such other weighting depends on which of the filter coefficients is (are) being adapted, (e.g., so that different weighting is applied to filter coefficients of different filters).

Using the updating vector elements σ[t+1,n], the example MGA embodiment updates (at each time t+1) the filter coefficients a[t,n] (determined for a previous time t) with smoothing of partial derivatives (as indicated in the above equation for a[t+1,n]) and preferably with time-index based weighting. Specifically, the filter coefficient adaptation step of the MGA example embodiment is:

$$a[t+1,n]=a[t,n]-\beta[n]\sigma[t+1,n]$$

where a[t+1, n] denotes the updated prediction filter coefficient of the "n"th filter, and where β[n] is a time-index based weight. Optionally, the time-index based weighting is omitted (i.e., each β[n] may have the value 1).

Thus, during adaptation (at a time t+1) of a current value (determined at previous time t) of filter coefficient a[t,n], the MGA embodiment of adaptation proceeds more rapidly with larger absolute values of β[n]σ[t+1, n] and less rapidly with smaller absolute values of β[n]σ[t+1, n].

With reference to the weights β[n], "time-index based" weighting denotes that each weight β[n] depends which filter coefficient (the "n"th filter coefficient) is being updated, in cases in which each index n corresponds to a time. For example, each weight β[n] may be one of the above-described weightings μ[k], where the index k corresponds to the index n, since in the above description of weightings μ[k], the index k identifies a filter coefficient of a filter having a tap index l (which tap index in turn corresponds to a time), so that the weightings μ[k] are time-index based in the sense that they distinguish between different ones of the filters of the described filterbank.

In the MGA embodiment of adaptation, it is apparent that the updating elements, σ[t+1,n], are determined by normalizing and scaling each gradient $\partial e^2[t]/\partial a[n]$ assuming it has moved forward by some amount from its previous value, and smoothing the adaptation in accordance with the smoothing factor γ. Each gradient $e^2[t]/\partial a[n]$ is normalized by multiplying it by the normalization factor $(f[t])^{-1/2})$, and this normalization increases adaptation step size when the prediction error is decreasing over time as expected, and decreases adaptation step size when the prediction error is not decreasing in an expected manner over time (e.g., in conditions of unexpected or unpredicted noise). During each adaptation step, each gradient $\partial e^2[t]/\partial a[n]$ is scaled by the rate factor μβ[n] as well as normalized. For as long as movement of the scaled, normalized gradient still has a similar direction to movement of the adjustment vector σ, the system will continue to increase the adaptation rate. If the gradients (or the scaled, normalized gradients) begin to behave unpredictably, e.g., to behave as noise (e.g., due to the prediction filter coefficients a[n], for all or some values of the index n, approaching minima, and/or due to noise in the audio path), the adaptation rate will be reduced due to the low-pass (smoothed) nature of the update step. In other words, the MGA method accelerates movement of the adaptation (the adaptation rate) until all or some of the gradients $\partial e^2[t]/\partial a[n]$ (which considered together, for all values of index n, are a gradient vector) or the scaled, normalized versions of the gradients, start to become more random. Thus, the adaptation of the prediction filter coefficients is controlled based on a direction of adaptation and a predictability of a gradient of adaptation.

Figure 4:
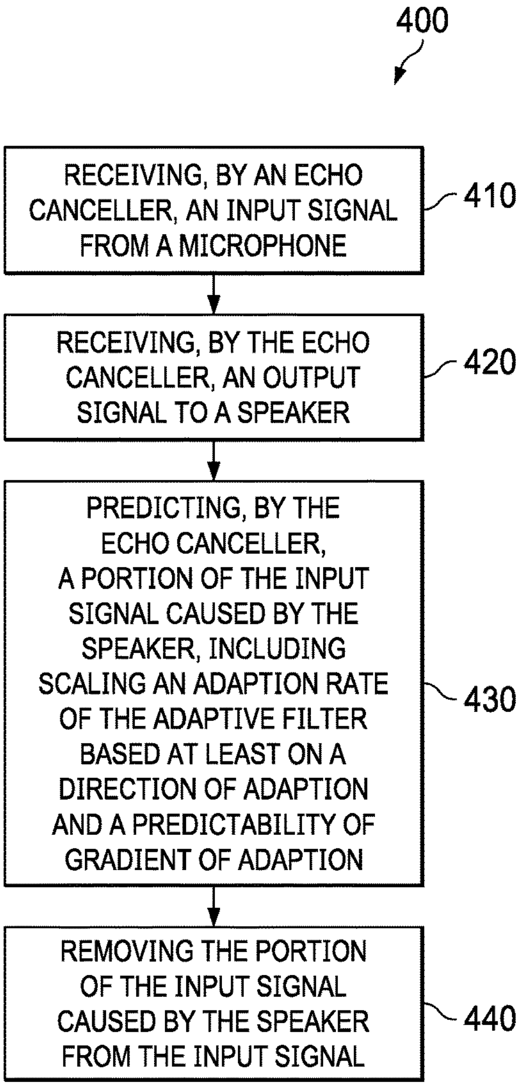
FIG. 4 is a flowchart of an example process of an echo cancellation in accordance with an embodiment of the invention (e.g., using smoothing of normalized gradient vectors).

FIG. 4 is a flowchart of an example process 400 of an echo cancellation in accordance with an embodiment of the invention (e.g., using smoothing of normalized gradient vectors, as in the above-described MGA embodiment of adaptation). Process 400 can be performed by an echo canceller system which may include one or more appropriately programmed processors. The echo canceller may be implemented in (or as) a device (e.g., a mobile device) including a microphone and a loudspeaker, and thus the echo canceller is sometimes referred to herein as a device.

With reference to FIG. 4, the echo canceller receives (410) an input signal from a microphone of a device. The echo canceller receives (420) an output signal (speaker feed) to a speaker on the same device as the microphone. The echo canceller predicts (430) a portion of (i.e., content of) the input signal caused by audio content of the speaker feed. The predicting includes configuring an adaptive filter based on the input signal and the output signal. The configuring includes scaling (i.e., controlling) an adaptation rate of the adaptive filter based at least on a direction of adaptation and a predictability of a gradient of adaptation. The echo canceller removes (440) from the input signal the portion of the input signal caused by audio content of the speaker feed.

Example System Architecture

Figure 5:
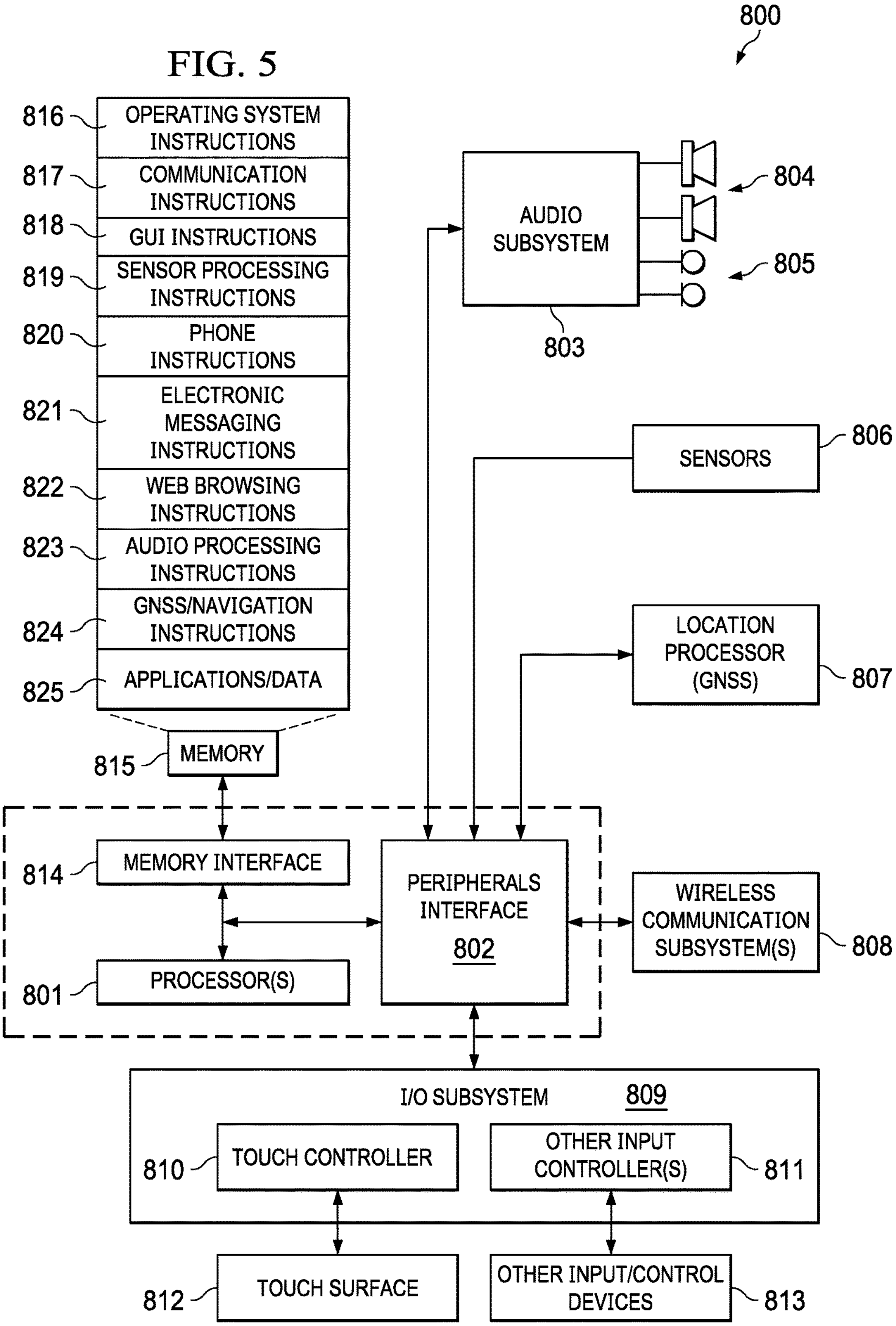
FIG. 5 is a mobile device architecture for implementing the features and processes described in reference to FIGS. 1-4, according to an embodiment.

FIG. 5 is a mobile device architecture (800) for implementing the features and processes described in reference to FIGS. 1-4, according to an embodiment. A device having architecture 800 can be configured (e.g., processor(s) 801 and audio subsystem 803 of the architecture can be configured) to perform echo cancellation (or steps thereof) with control of prediction filter adaptation step size in accordance with an embodiment of the invention. Architecture 800 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown in FIG. 5, architecture 800 is for a smart phone and includes processor(s) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystem(s) 809 (which include(s) touch controller 810 and other input controllers 811), touch surface 812, and other input/control devices 813, coupled as shown. Other architectures with more or fewer components can also be used to implement the disclosed embodiments.

Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing (including echo cancellation) described in reference to FIGS. 1-4.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Aspects of some embodiments of the present invention may be appreciated from one or more of the following example embodiments ("EEE"s):

EEE1. An echo cancellation method, including:
- receiving, by an echo canceller, an input signal from a microphone;
- receiving, by the echo canceller, an output signal to a speaker;
- predicting, by the echo canceller, echo content of the input signal caused by sound emission by the speaker in response to the output signal, wherein the predicting includes adaptation of at least one prediction filter with adaptation step size controlled using gradient descent on a set of filter coefficients of the filter, where control of the adaptation step size is based at least in part on a direction of adaptation and a predictability of a gradient of adaptation; and
- removing, from the input signal, at least some of the echo content which has been predicted during the predicting step.

EEE2. The method of EEE1, wherein each adaptation step of the adaptation determines an updated set of filter coefficients, $\theta_n$, from a previously determined set of filter coefficients, $\theta_{n-1}$, including by subtraction of an updating term, $\sigma_n$, from the previously determined set of filter coefficients, wherein the updating term is determined at least in part by the gradient of adaptation.

EEE3. The method of EEE1 or EEE2, wherein the adaptation determines at least one coefficient a[k] of the filter, with each adaptation step of the adaptation determining an updated version, a[t+1, k], of the coefficient a[k], in response to a previously determined version, a[t,k], of the coefficient a[k], where t denotes time, and where:

$$a[t+1,k]=a[t,k]-(X[t]/N)\cdot(\partial|e[t]|^2/\partial a[k])$$

where X[t] is a time-varying weight, 1/N is a normalization factor, |e[t]| is absolute value of a prediction error e[t] at time t, and $\partial|e[t]|^2/\partial a[k]$ is the gradient of adaptation.

EEE4. The method of EEE3, wherein the weight X[t] increases the adaptation step size when the prediction error is decreasing in an expected manner, and decreases the adaptation speed at times when the prediction error is not decreasing in the expected manner, and wherein the normalization factor 1/N is a dynamic normalization factor whose value increases when the adaptation approaches convergence.

EEE5. The method of EEE3 or EEE4, wherein X[t]=μ[k] s[t], where s[t] is a time-varying weight, μ[k] is a time-index based weight for the coefficient a[k], the prediction filter has a filter tap index l, the weight μ(k) depends on the value of the filter tap index l.

EEE6. The method of EEE1 or EEE2, wherein the gradient descent is Nesterov accelerated gradient descent.

EEE7. The method of EEE6, wherein the adaptation determines at least one coefficient a[n] of the filter, with each adaptation step of the adaptation determining an updated version, a[t+1, n], of the coefficient a[n], in response to a previously determined version, a[t,n], of the coefficient a[n], where t denotes time, and where:

$$a[t+1,n]=a[t,n]-\sigma[t+1,n]$$

where:

$$\sigma[t+1,n]=\gamma\sigma[t,n]+(\mu\cdot(\partial e^2[t]/\partial a[n]))/(f[t])^{1/2},$$

and where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

EEE8. The method of EEE6, wherein the adaptation determines at least one coefficient a[n] of the filter, with each adaptation step of the adaptation determining an updated version, a[t+1, n], of the coefficient a[n], in response to a previously determined version, a[t,n], of the coefficient a[n], where t denotes time, and where:

$$a[t+1,n]=a[t,n]-\beta[n]\sigma[t+1,n]$$

where β[n] is a time-index based weight, and where:

$$\sigma[t+1,n]=\gamma\sigma[t,n]+(\mu\cdot(\partial e^2[t]/\partial a[n]))/(f[t])^{1/2},$$

where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

EEE9. The method of EEE8, wherein β[n] is a time-index based weight for the coefficient a[n], the prediction filter which includes the coefficient a[n] has a filter tap index l, and the weight β[n] depends on the value of the filter tap index l.

EEE10. The method of any of EEE1-EEE9, wherein during adaptation of the prediction filter, control of the adaptation step size is based at least in part on a filter tap index of said prediction filter.

EEE11. A non-transitory computer-readable medium storing instructions that, when executed by at least one processor, cause the at least one processor to perform the method of any of EEE1-EEE10.

EEE12. A system configured to perform echo cancellation, said system comprising:
- at least one processor, coupled and configured to receive an input signal from a microphone and an output signal to a speaker, and to determine at least one prediction filter in response to the input signal and the output signal wherein the at least one processor is configured to predict echo content of the input signal caused by sound emission by the speaker in response to the output signal, including by performing adaptation of the prediction filter with adaptation step size controlled using gradient descent on a set of filter coefficients of the filter, where control of the adaptation step size is based at least in part on a direction of adaptation and a predictability of a gradient of adaptation, and wherein the at least one processor is coupled and configured to process the input signal to remove from said input signal at least some of the echo content which has been predicted.

EEE13. The system of EEE12, wherein each adaptation step of the adaptation determines an updated set of filter coefficients, $\theta_n$, from a previously determined set of filter coefficients, $\theta_{n-1}$, including by subtraction of an updating term, $\sigma_n$, from the previously determined set of filter coefficients, wherein the updating term is determined at least in part by the gradient of adaptation.

EEE14. The system of EEE12 or EEE13, wherein the adaptation determines at least one coefficient a[k] of the filter, with each adaptation step of the adaptation determining an updated version, a[t+1, k], of the coefficient a[k], in response to a previously determined version, a[t,k], of the coefficient a[k], where t denotes time, and where:

$$a[t+1,k]=a[t,k]-(X[t]/N)\cdot(\partial|e[t]|^2/\partial a[k])$$

where X[t] is a time-varying weight, 1/N is a normalization factor, |e[t]| is absolute value of a prediction error e[t] at time t, and $\partial|e[t]|^2/\partial a[k]$ is the gradient of adaptation.

EEE15. The system of EEE14, wherein the weight X[t] increases the adaptation step size when the prediction error is decreasing in an expected manner, and decreases the adaptation speed at times when the prediction error is not decreasing in the expected manner, and wherein the normalization factor 1/N is a dynamic normalization factor whose value increases when the adaptation approaches convergence.

EEE16. The system of EEE14 or EEE15, wherein X[t]=μ[k]s[t], where s[t] is a time-varying weight, μ[k] is a time-index based weight for the coefficient a[k], the prediction filter has a filter tap index l, the weight μ(k) depends on the value of the filter tap index l.

EEE17. The system of EEE12 or EEE13, wherein the gradient descent is Nesterov accelerated gradient descent.

EEE18. The system of EEE17, wherein the adaptation determines at least one coefficient a[n] of the filter, with each adaptation step of the adaptation determining an updated version, a[t+1, n], of the coefficient a[n], in response to a previously determined version, a[t,n], of the coefficient a[n], where t denotes time, and where:

$$a[t+1,n]=a[t,n]-\sigma[t+1,n]$$

where:

$$\sigma[t+1,n]=\gamma\sigma[t,n]+(\mu\cdot(\partial e^2[t]/\partial a[n]))/(f[t])^{1/2},$$

and where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

EEE19. The system of EEE17, wherein the adaptation determines at least one coefficient a[n] of the filter, with each adaptation step of the adaptation determining an updated version, a[t+1, n], of the coefficient a[n], in response to a previously determined version, a[t,n], of the coefficient a[n], where t denotes time, and where:

$$a[t+1,n]=a[t,n]-\beta[n]\sigma[t+1,n]$$

where β[n] is a time-index based weight, and where:

$$\sigma[t+1,n]=\gamma\sigma[t,n]+(\mu\cdot(\partial e^2[t]/\partial a[n]))/(f[t])^{1/2},$$

where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

EEE20. The system of EEE19, wherein β[n] is a time-index based weight for the coefficient a[n], the prediction filter which includes the coefficient a[n] has a filter tap index l, and the weight β[n] depends on the value of the filter tap index l.

EEE21. The system of any of EEE12-EEE20, wherein during adaptation of the prediction filter, control of the adaptation step size is based at least in part on a filter tap index of said prediction filter.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An echo cancellation method, including:

receiving, by an echo canceller, an input signal from a microphone;

receiving, by the echo canceller, an output signal to a speaker;

predicting, by the echo canceller, echo content of the input signal caused by sound emission by the speaker in response to the output signal, wherein the predicting includes adaptation of at least one prediction filter with adaptation step size controlled using gradient descent on a set of filter coefficients of the filter, where control of the adaptation step size is based at least in part on a direction of adaptation and a predictability of a gradient of adaptation; and removing, from the input signal, at least some of the echo content which has been predicted during the predicting step, wherein the adaptation determines at least one coefficient a[k] of the filter, with each adaptation step of the adaptation determining an updated version, a[t+1, k], of the coefficient a[k], in response to a previously determined version, a[t,k], of the coefficient a[k], where t denotes time, and where:

$$a[t+1,k]=a[t,k]-(X[t]/N)\cdot(\partial|e[t]|^2/\partial a[k])$$

where X[t] is a time-varying weight, 1/N is a normalization factor, |e[t]| is absolute value of a prediction error e[t] at time t, and $\partial|e[t]|^2/\partial a[k]$ is the gradient of adaptation.

2. The method of claim 1, wherein each adaptation step of the adaptation determines an updated set of filter coefficients, $\theta_n$, from a previously determined set of filter coefficients, $\theta_{n-1}$, including by subtraction of an updating term, $\sigma_n$, from the previously determined set of filter coefficients, wherein the updating term is determined at least in part by the gradient of adaptation.

3. The method of claim 1, wherein the weight X[t] increases the adaptation step size when the prediction error is decreasing in an expected manner, and decreases the adaptation speed at times when the prediction error is not decreasing in the expected manner, and wherein the normalization factor 1/N is a dynamic normalization factor whose value increases when the adaptation approaches convergence.

4. The method of claim 1, wherein X[t]=μ[k]s[t], where s[t] is a time-varying weight, μ[k] is a time-index based weight for the coefficient a[k], the prediction filter has a filter tap index l, the weight μ(k) depends on the value of the filter tap index l.

5. The method of claim 1, wherein the gradient descent is Nesterov accelerated gradient descent.

6. The method of claim 5, wherein the adaptation determines at least one coefficient a[n] of the filter, with each adaptation step of the adaptation determining an updated version, a[t−1, n], of the coefficient a[n], in response to a previously determined version, a[t,n], of the coefficient a[n], where t denotes time, and where:

$$a[t+1,n]=a[t,n]-\beta[n]\sigma[t+1,n]$$

where:

$$\sigma[t+1,n]=\gamma\sigma[t,n]+(\mu\cdot(\partial e^2[t]/\partial a[n]))/(f[t])^{1/2},$$

and where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

7. The method of claim 5, wherein the adaptation determines at least one coefficient a[n] of the filter, with each adaptation step of the adaptation determining an updated version, a[t−1, n], of the coefficient a[n], in response to a previously determined version, a[t,n], of the coefficient a[n], where t denotes time, and where:

$$\sigma[t+1,n]=a[t,n]-\beta[n]\sigma[t+1,n]$$

where β[n] is a time-index based weight, and where:

$$\sigma[t+1,n]=\gamma\sigma[t,n]+(\mu\cdot(\partial e^2[t]/\partial a[n]))/(f[t])^{1/2},$$

where γ is a smoothing factor, μ is a factor, $1/(f[t])^{1/2}$ is a normalization factor, $e^2[t]$ is squared prediction error at time t, and $\partial e^2[t]/\partial a[n]$ is the gradient of adaptation.

8. The method of claim 7, wherein β[n] is a time-index based weight for the coefficient a[n], the prediction filter which includes the coefficient a[n] has a filter tap index l, and the weight β[n] depends on the value of the filter tap index l.

9. An echo cancellation method, including:

receiving, by an echo canceller, an input signal from a microphone;

receiving, by the echo canceller, an output signal to a speaker;

predicting, by the echo canceller, echo content of the input signal caused by sound emission by the speaker in response to the output signal, wherein the predicting includes adaptation of at least one prediction filter with adaptation step size controlled using gradient descent on a set of filter coefficients of the filter, where control of the adaptation step size is based at least in part on a direction of adaptation and a predictability of a gradient of adaptation; and removing, from the input signal, at least some of the echo content which has been predicted during the predicting step, wherein during adaptation of the prediction filter, control of the adaptation step size is based at least in part on a filter tap index of said prediction filter.

10. A system, comprising one or more processors, configured to perform echo cancellation by performing the method of claim 9.

11. A non-transitory computer-readable medium storing instructions that, when executed by at least one processor, cause the at least one processor to perform the method of claim 9.

12. A non-transitory computer-readable medium storing instructions that, when executed by at least one processor, cause the at least one processor to perform the method of claim 1.

13. A system configured to perform echo cancellation, said system comprising:

at least one processor, coupled and configured to receive an input signal from a microphone and an output signal to a speaker, and to determine at least one prediction filter in response to the input signal and the output signal wherein the at least one processor is configured to predict echo content of the input signal caused by sound emission by the speaker in response to the output signal, including by performing adaptation of the prediction filter with adaptation step size controlled using gradient descent on a set of filter coefficients of the filter, where control of the adaptation step size is based at least in part on a direction of adaptation and a predictability of a gradient of adaptation, and wherein the at least one processor is coupled and configured to process the input signal to remove from said input signal at least some of the echo content which has been predicted, wherein the adaptation determines at least one coefficient a[k] of the filter, with each adaptation step of the adaptation determining an updated version, a[t+1], of the coefficient a[k], in response to a previously determined version, a[t,k], of the coefficient a[k], where t denotes time, and where:

$$a[t+1,k]=a[t,k]-(X[t]/N)\cdot(\partial|e[t]|^2/\partial a[k])$$

where X[t] is a time-varying weight, 1/N is a normalization factor, |e[t]| is absolute value of a prediction error e[t] at time t, and $\partial|e[t]|^2/\partial a[k]$ is the gradient of adaptation.

14. The system of claim 13, wherein each adaptation step of the adaptation determines an updated set of filter coefficients, $\theta_n$, from a previously determined set of filter coefficients, $\theta_{n-1}$, including by subtraction of an updating term, $\sigma_n$, from the previously determined set of filter coefficients, wherein the updating term is determined at least in part by the gradient of adaptation.

15. The system of claim 13, wherein the weight X[t] increases the adaptation step size when the prediction error is decreasing in an expected manner, and decreases the adaptation speed at times when the prediction error is not decreasing in the expected manner, and wherein the normalization factor 1/N is a dynamic normalization factor whose value increases when the adaptation approaches convergence.

16. The system of claim 13, wherein X[t]=μ[k]s[t], where s[t] is a time-varying weight, μ[k] is a time-index based weight for the coefficient a[k], the prediction filter has a filter tap index l, the weight μ(k) depends on the value of the filter tap index l.

17. The system of claim 13, wherein the gradient descent is Nesterov accelerated gradient descent.

18. The system of claim 17, wherein the adaptation determines at least one coefficient a[n] of the filter, with each adaptation step of the adaptation determining an updated version, a[t−1, n], of the coefficient a[n], in response to a previously determined version, a[t,n], of the coefficient a[n], where t denotes time, and where:

$$a[t+1,n]=a[t,n]-\sigma[t+1,n]$$

where:

$$\sigma[t+1,n]=\gamma\sigma[t,n]+(\mu\cdot(\partial e^2[t]/\partial a[n]))/(f[t])^{1/2},$$

and where $\gamma$ is a smoothing factor, $\mu$ is a factor, $1/(f[t])^{1/2}$ is a normalization factor, $e^2[t]$ is squared prediction error at time t, and $\partial e^2[t]/\partial a[n]$ is the gradient of adaptation.

19. The system of claim 17, wherein the adaptation determines at least one coefficient a[n] of the filter, with each adaptation step of the adaptation determining an updated version, a[t−1, n], of the coefficient a[n], in response to a previously determined version, a[t,n], of the coefficient a[n], where t denotes time, and where:

$$a[t+1,n]=a[t,n]-\beta[n]\sigma[t+1,n]$$

where $\beta[n]$ is a time-index based weight, and where:

$$\sigma[t+1,n]=\gamma\sigma[t,n]+(\mu\cdot(\partial e^2[t]/\partial a[n]))/(f[t])^{1/2},$$

where $\gamma$ is a smoothing factor, $\mu$ is a factor, $1/(f[t])^{1/2}$ is a normalization factor, $e^2[t]$ is squared prediction error at time t, and $\partial e^2[t]/\partial a[n]$ is the gradient of adaptation.

20. The system of claim 19, wherein $\beta[n]$ is a time-index based weight for the coefficient a[n], the prediction filter which includes the coefficient a[n] has a filter tap index l, and the weight $\beta[n]$ depends on the value of the filter tap index l.

* * * * *